(No Model.)
F. W. GORDON.
TUYERE PIPE.
No. 294,123. Patented Feb. 26, 1884.
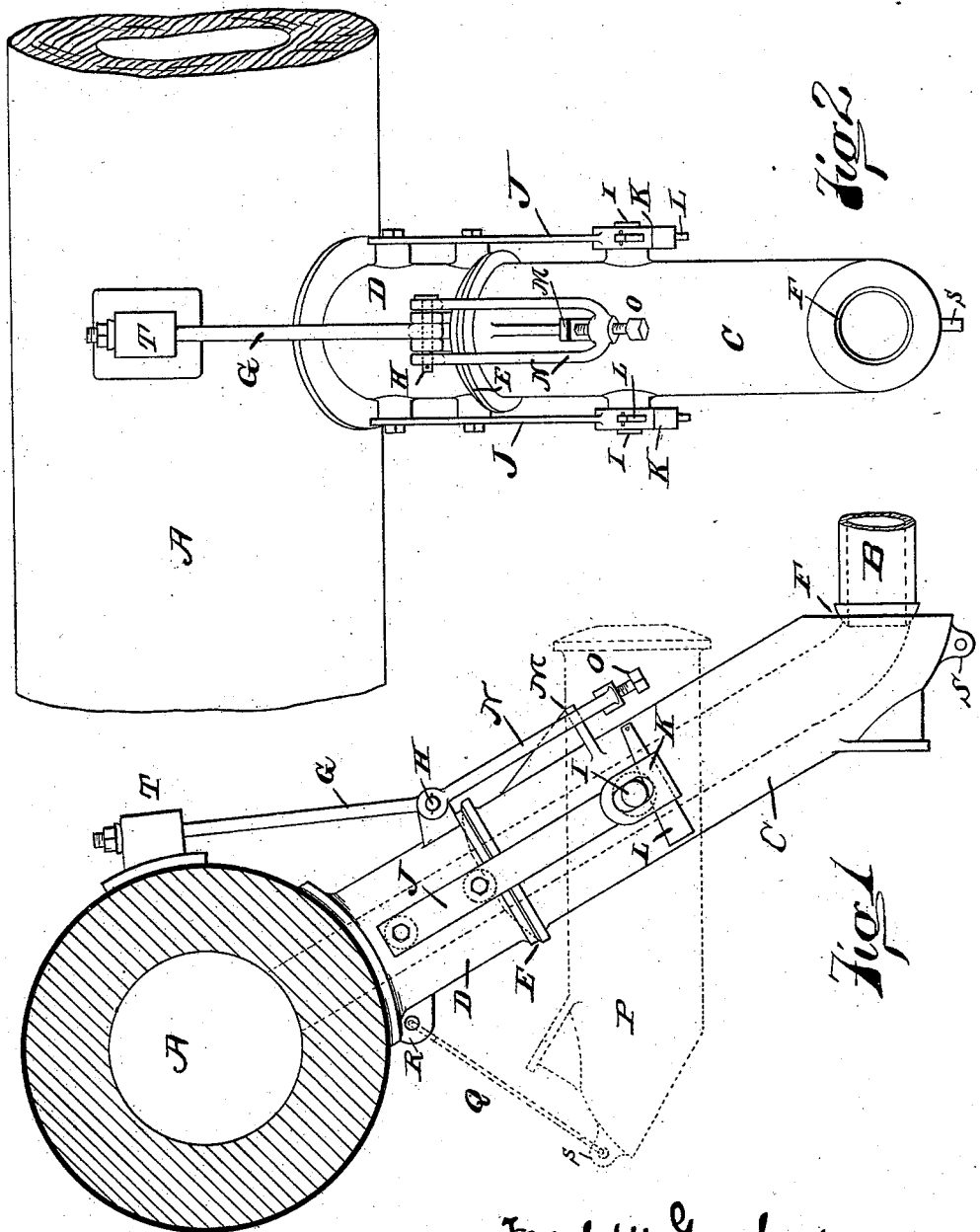
WITNESSES:
Fred W. Gordon INVENTOR
by James W. See
ATTORNEY

UNITED STATES PATENT OFFICE.

FRED. W. GORDON, OF PITTSBURG, PENNSYLVANIA.

TUYERE-PIPE.

SPECIFICATION forming part of Letters Patent No. 294,123, dated February 26, 1884.

Application filed September 21, 1883. (No model.)

*To all whom it may concern:*

Be it known that I, FRED. W. GORDON, of Pittsburg, Allegheny county, Pennsylvania, have invented certain new and useful Improvements in Tuyere-Pipes, of which the following is a specification.

This invention pertains to the tuyere-pipes of blast-furnaces; and it relates particularly to the method and means for supporting the pipe, whereby the pipe may be readily and perfectly gotten out of the way when the tuyere is to be inspected or worked with.

In the accompanying drawings, Figure 1 represents in side elevation a tuyere-pipe embodying my improvement, and Fig. 2 is a face view of the same.

In the drawings, A represents the circle-pipe of a blast-furnace; B, the pipe connecting directly with the tuyere; C, the tuyere-pipe connecting the circle-pipe with pipe B; D, the neck-piece of the tuyere-pipe secured to the circle-pipe; E, a globe-joint at the juncture of the tuyere-pipe with the neck-piece; F, the joint between tuyere-pipe and pipe C; G, a tie-bolt serving to sustain the structure and relieve the connection where the neck-piece joins the circle-pipe; H, a pin carried in lugs on the neck-piece, and serving as the attaching-point for the lower end of tie-bolt G; I, a pair of trunnions upon the tuyere-pipe at such point in its length as to secure a reasonable balancing of the tuyere-pipe when supported by the trunnions; J, a pair of side bars rigidly secured to the neck-piece; K, heads upon the lower end of the side bars, forming very loose bearings for the trunnions; L, keys through heads K and bearing against the trunnions, whereby the joint E may be made tight or free, as desired; M, a lug or short lever cast on the face of the tuyere-pipe; N, a stirrup hung to bolt H and arranged to swing down over lug M; O, a set-screw in the stirrup bearing against the lug M; R, an eye in the neck-piece, and S a similar eye in the foot of the tuyere-pipe.

With the parts in the position shown, the set-screw O serves to strain the pipe to the right and tighten the joint at F and at the other extremity of the pipe B, after the manner of the device set forth in Patent No. 253,527, granted to me February 14, 1882. If the screw O be freed and the stirrup turned up and the keys L slackened, the tuyere-pipe is free to be turned into the position indicated by dotted lining P. Being fairly balanced, the operation requires but little labor, and there is no sudden falling back of the heavy pipe, as usual, upon the release of the supporting devices. The horizontal position of the pipe leaves a clear space for working at the tuyeres. Q is a sustaining-rod hooked into the eyes, to prevent the tipping of the pipe while in this position.

The invention is applicable to tuyere-pipes provided with straining and supporting devices other than the screw-and-lug arrangement shown. In fact, the invention has no reference to the means for connecting the tuyere-pipe to its tuyere. The bearings for the trunnions need not necessarily be supported by the neck-piece, as they may be attached to the furnace itself or to supports resting on the ground, other usual and suitable means being of course provided for making tight the joint at E. Screws may of course be used instead of the wedges or keys shown, and if the trunnion-bearing supports are not utilized in making tight the joint at E, as just mentioned, neither screws nor keys will be needed.

With the tuyere-pipe in the position shown in dotted line, its entire interior and exterior, including the joint-faces, may be inspected and repaired.

I claim as my invention—

1. A tuyere-pipe for blast-furnaces, provided with and supported on trunnions, and adapted to be turned into a horizontal position above the plane of the tuyeres, substantially as and for the purpose set forth.

2. The tuyere-pipe provided with trunnions, combined with the trunnion-bearings rigidly connected with the circle-pipe of the furnace, and provided with keys or their equivalent engaging the trunnions, substantially as and for the purpose set forth.

3. The combination of the tuyere-pipe provided with trunnions, the neck-piece, the side bars rigidly secured to the neck-piece and carrying loose bearings for the trunnions, and the bearing-keys or their equivalent, substantially as and for the purpose set forth.

FRED. W. GORDON.

Witnesses:
JAMES A. McKEAN,
THOMAS DEEGAN.